United States Patent Office 3,288,869
Patented Nov. 29, 1966

3,288,869
PROCESS FOR THE PREPARATION OF TRICYCLO-[3.3.2.0$^{4,6}$]DECA-2,7,9-TRIENE
Gerhard Friedrich Schroeder, Brussels, Belgium, assignor to Union Carbide Corporation, a corporation of New York
No Drawing. Filed Feb. 7, 1964, Ser. No. 343,219
9 Claims. (Cl. 260—666)

This invention relates to a novel process for the preparation of a polycyclic hydrocarbon. In one aspect, this invention relates to a novel two-step process for the preparation of tricyclo[3.3.2.0$^{4,6}$]deca-2,7,9-triene from a readily available starting material.

In a recent article by W. Von E. Doering and W. R. Roth, Angew. Chem. 75, 27 (1963); Angew. Chem. Internat. Edit., 2,122 (1963); and tetrahedron 19, 715 (1963), directed to the Cope rearrangement of various dienes and trienes, the composition tricyclo[3.3.2.0$^{4,6}$]deca-2,7,9-triene was proposed as a hypothetical and a uniquely interesting molecule. It was theorized that if the Cope rearrangement operates for the proposed structure, the individual carbon atoms must circulate freely about the structure independent of each other. However, no method was proposed or suggested for the synthesis of this compound and hence, prior to this invention the composition had never actually been synthesized.

It is, therefore, an object of this invention to provide a novel process for the preparation of a highly unique and interesting molecule. Another object of this invention is to provide a novel synthetic route to tricyclo[3.3.2.0$^{4,6}$]deca-2,7,9-triene. A further object is to provide a novel process for the preparation of tricyclo[3.3.2.0$^{4,6}$]deca-2,7,9-triene from a readily available starting material. A still further object of this invention is to provide a novel process wherein the product is obtained in relatively high yields by a two step process involving the dimerization of cyclooctatetraene and subsequent cleavage of the dimer to the tricyclo[3.3.2.0$^{4,6}$]deca-2,7,9-triene. These and other objects will readily become apparent to those skilled in the art in the light of the teachings herein set forth.

In general, the compound, tricyclo[3.3.2.0$^{4,6}$]deca-2,7,9-triene can be prepared by a two-step process involving the dimerization of cyclooctatetraene and subsequent cleavage of the dimer to the polycyclic triene. In the first step of the instant novel process dimeric cyclooctatetraene (II) is formed from cyclooctatetraene (I) in accordance with the following equation:

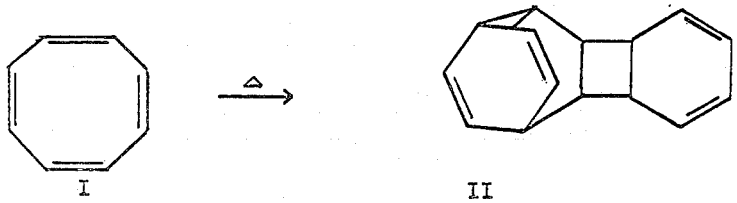

thereafter, the dimeric product is cleaved across the cyclobutyl nucleus by exposure to radiation to give tricyclo[3.3.2.0$^{4,6}$]deca-2,7,9-triene (III) and benzene.

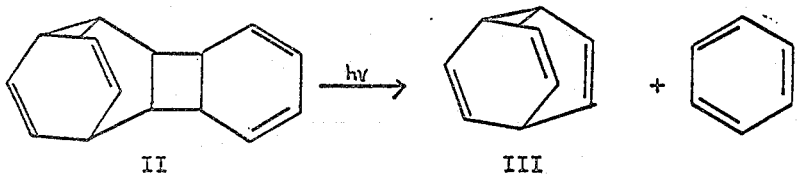

Infrared and nuclear magnetic resonance analysis of both the dimer and tricyclo[3.3.2.0$^{4,6}$]deca-2,7,9-triene verified that the compositions had the assigned structure.

Dimerization of cyclooctatetraene is most conveniently effected by merely heating the composition to temperatures up to about 125° C. for a period of time sufficient to form optimum yields of the dimer. Temperatures above 125° C., while operable, are less preferred due to the further dimerization which result in tetramers and higher molecular weight products. Although cyclooctatetraene slowly dimerizes at room temperature, for economic considerations temperatures of from 25° to 125° C., and more preferable 90° to 110° C. are employed. In practice, it has been found that optimum yields of the dimer are obtained when heating is effected at 100° C. over a period of about 70 hours. However, temperatures and periods above and below the aforesaid ranges can equally as well be employed but are less preferred.

While the dimerization step can be conducted in air, it is preferred to operate under an inert atmosphere such as nitrogen, argon and the like.

Separation of unreacted cyclooctatetraene from the dimer can be conveniently effected by distillation at reduced pressures. Thereafter the dimeric cyclooctatetraene can be purified by recrystillization from suitable solvents such as ethanol, and the like.

Cleavage of the cyclobutyl nucleus of the dimeric cyclooctatetraene to form tricyclo[3.3.2.0$^{4,6}$]deca-2,7,9-triene and benzene as a by-product is conveniently effected by exposing the dimer to a radiation source having wavelengths shorter than 7000 angstroms such as X-rays, ultraviolet light, and the like. It is particularly desirable to utilize radiation in wavelengths of from about 0.005 angstrom to about 4500 angstroms and most preferable from about 2000 to about 4000 angstroms. In practical operation of the instant novel process, optimum results are obtained within the aforesaid most preferred range.

By the term "radiation" as employed throughout the specification and appended claims, is meant electromagnetic radiation, such as for example, X-rays, gamma rays and the like, or particulate radiation such as alpha, beta, and similar radiation.

The radiation which is sufficient to cleave the cyclobutyl nucleus can be achieved by the use of a gamma radiation source, such as cobalt 60, a Van de Graff generator, and the like; an X-ray source such as vacuum tube; an ultraviolet light source such as xenon lamp, mercury arc, and the like; a near ultraviolet source such as argon arc, mercury arc, xenon lamp and the like; a visible light source such as sunlight, sunlamp, tungsten bulb, carbon arc, a laser, a nitrogen plasma arc, an oxygen induction coil and the like. Additionally, the radiation source can be an electromagnetic propagating source.

Conditions of exposure of the dimeric cyclooctatetraene to the energy source, will of course vary depending upon the particular radiation employed. Additionally, the vessel or use of any solvents with the dimeric composition will influence the optimum exposure conditions. In practice, it has been found that the optimum yield of tricyclo[3.3.2.0$^{4,6}$]deca-2,7,9-triene is obtained by exposure of the dimer contained in an inert solvent to an ultraviolet light source.

The cleavage of the dimerized cyclooctatetraene is preferably conducted in a solvent in which the reactants are at least partially soluble and which is inert to the cyclooctatetraene and the polycyclic hydrocarbon product obtained therefrom. When the energy source employed to cleave the cyclobutyl nucleus is ultraviolet irradiation it is also preferred, from economic considerations, that the solvent itself does not absorb or screen the energy from the dimer. The solvent chosen should preferably be one capable of dissolving the dimer and from which tricyclo-[3.3.2.0$^{4,6}$]deca-2,7,9-triene can be easily recovered by known techniques, such as crystallization distillation and the like. Suitable solvents which can be employed in the practice of this invention include organic solvents such as, aliphatic hydrocarbons such as pentanes, hexanes, heptanes, and the like; ethers for example, diethyl ether, dibutyl ether, and the like; ketones, such as acetone, methyl ethyl ketone, and the like; cycloaliphatic hydrocarbons such as cyclohexane, cycloheptane and the like.

The period of exposure as well as the degree the radiation is easily determined by routine experimentation for each particular energy source. For instance, it has been found that when a solvent such as diethyl ether is employed, and ultraviolet radiation is the energy source, yields as high as 80 percent and higher are obtained after exposure of 24 hours.

As hereinbefore indicated, the tricyclo[3.3.2.0$^{4,6}$]-deca-2,7,9-triene obtained by the novel process of this invention is a particularly attractive hydrocarbon composition and is characterized by unique and unprecedented properties. As theorized in the aforementioned Doering and Roth article and confirmed by nuclear magnetic resonance studies of tricyclo[3.3.2.0$^{4,6}$]deca-2,7,9-triene itself, no two carbon atoms of the compound remain bonded to each other, and all ten carbon atoms wander over the surface of a sphere in an ever changing relationship to each other. This rapid and reversible valence isomerization characterizes this unique composition of matter in the words of Doering and Roth as the molecule with the ideal "fluxional structure" and provides a variety of interesting properties and commercially attractive uses in agricultural, pharmaceutical, and like applications.

The composition itself, tricyclo[3.3.2.0$^{4,6}$]deca-2,7,9-triene, is a high melting compound which is thermally stable at temperatures as high as 350° C. However, as indicated in Example III, at temperatures above 400° C. it decomposes to provide a relatively pure form of naphthalene. Moreover, the polycyclic composition, like naphthalene, also undergoes a gradual sublimation at room temperature and is useful as a substitute for camphor, naphthalene, and the like, in such applications as, for example, the storage of woolen and other garments as a melting point depressant, and the like. Of particular interest, is the use of tricyclo[3.3.2.0$^{4,6}$]deca-2,7,9-triene in agricultural applications. For example, this compound has been found to be useful as an active toxicant in agricultural formulations and can conveniently be employed with an inert solid or liquid carrier, such as attapulgite or acetone respectively. Additionally, the composition being unsaturated can be utilized as a reactive intermediate to produce numerous chemical derivatives.

The following examples are illustrative.

EXAMPLE I

*A. Synthesis of the cyclooctatetraene dimer*

217 grams of freshly distilled cyclooctatetraene contained in a flask were heated in an oil bath to 100° C. over a period of 68 hours under oxygen-free conditions. Thereafter unreacted cyclooctatetraene was distilled off at a pressure approximately 1 millimeter of mercury. At the end of the distillation the oil bath temperature was raised to about 60° C. and the pressure reduced to 0.1 millimeter of mercury. There remained in the flask 62 grams of a yellow and viscous oil which was then dissolved in 25 milliliters of ether. This solution was maintained for 24 hours at a temperature of from 0° C. to −5° C. During this time 22 grams of the dimeric cyclooctatetraene crystallized. The crude dimer was recrystallized three times from ethanol to give 18 grams of the dimer having a melting point of 75 to 76° C. Infrared analysis and temperature dependent nuclear magnetic resonance spectra confirm the assigned structure.

*B. Synthesis of tricyclo[3.3.2.0$^{4,6}$]deca-2,7,9-triene*

In a one liter three necked flask equipped with magnetic stirrer, reflux condenser, nitrogen inlet and an internal ultraviolet lamp equipped with a cooling system were dissolved in 900 milliliters of ether 22 grams of the cyclooctatetraene dimer. The clear solution was irradiated for 24 hours with ultraviolet light. Thereafter, the ether was distilled off over a column under reflux. The liquid residue was then transferred into a small distillation apparatus. Benzene which was generated during the irradiation reaction was distilled off together with a small amount of ether at a pressure of about 20 millimeters of mercury and an oil bath temperature of about 40° C. The benzene ether solution was redistilled and the fraction remaining which had a boiling point of 75 to 80° C. was subjected to infrared spectrum analysis and gas chromatographic analysis. The results of the analysis were identical to those obtained on authentic samples of benzene. The crystalline residue from the distillation was twice sublimed at an oil bath temperature of from 40 to 60° C. and a pressure of from 1 to 14 millimeters of mercury. There was obtained 11.0 grams of the tricyclo-[3.3.2.0$^{4,6}$]-deca-2,7,9-triene having a melting point of 93 to 95° C. This represented 80 percent of the theoretical yield. After recrystallization from ethanol and subsequent sublimation, the tricyclo[3.3.2.0$^{4,6}$]deca-2,7,9-triene had a melting point of 95 to 96° C.

Upon analysis the product was found to have the following properties and composition—Molecular weight for $C_{10}H_{10}$, calculated: 130.18. Found: 126. Calculated for $C_{10}H_{10}$: C, 92.26; H, 7.74. Found: C, 92.46; H, 7.85.

Nuclear magnetic resonance (NMR) analysis proved the NMR spectra of tricyclo[3.3.2.0$^{4,6}$]deca-2,7,9-triene to be temperature dependent. For example, the NMR spectra at 100° C. consisted only of a single sharp line at tau 5.8. At −40° C. however, the NMR spectra consisted of a multiplett centered around tau 4.4 and of a multiplett centered around tau 7.9 with relative peak area of 3:2.

EXAMPLE II

*A. Synthesis of the cyclooctatetraene dimer*

217 grams of freshly distilled cyclooctatetraene contained in a flask are heated in an oil bath to 100° C. over a period of 68 hours under a nitrogen atmosphere. Thereafter unreacted cyclooctatetraene is distilled off at a pressure approximately 1 millimeter of mercury. At the end of the distillation the oil bath temperature is raised to about 60° C. and the pressure reduced to 0.1 millimeter of mercury. There remains in the flask 62 grams of a yellow and viscous oil which is then dissolved in 25 milliliters of ether. This solution is maintained for 24 hours at a temperature of from 0° C. to −5° C. During this time 22 grams of the dimeric cyclooctatetraene crystallizes from the solution. The crude dimer is then recrystallized three times from ethanol to give 18 grams of a product having a melting point of 75 to 76° C. Infrared analysis indicates that the product has the assigned structure. The temperature dependent NMR spectra confirm the assigned structure.

B. Synthesis of tricyclo[3.3.2.0⁴,⁶]deca-2,7,9-triene

In a one liter three necked flask equipped with magnetic stirrer, reflux condenser and nitrogen inlet are dissolved in 900 milliliters of pentane 22 grams of the cyclooctatetraene dimer. The clear solution is irradiated for 24 hours with ultraviolet light. Thereafter, the pentane is distilled off over a column under reflux. The liquid residue is then transferred into a small distillation apparatus. Benzene which is generated during the irradiation reaction is distilled off together with a small amount of pentane at a pressure of about 20 millimeters of mercury and an oil bath temperature of about 40° C. The benzene pentane solution is redistilled and the fraction remaining which has a boiling point of 75 to 80° C. is subjected to infrared spectrum analysis and gas chromatographic analysis. The results of the analysis are identical to those obtained on authentic samples of benzene. The crystalline residue from the distillation is twice sublimed. There are obtained 11.0 grams of tricyclo[3.3.2.0⁴,⁶]deca-2,7,9-triene having a melting point of 93 to 95° C. This represents 80 percent of the theoretical yield. After recrystallization from ethanol and subsequent sublimation, the tricyclo[3.3.2.0⁴,⁶]deca-2,7,9-triene has a melting point of 95 to 96° C.

Upon analysis the product is found to have the following properties and composition—Molecular weight for $C_{10}H_{10}$, calculated: 130.18. Found: 126. Calculated for $C_{10}H_{10}$: C, 92.26; H, 7.74. Found: C, 92.46; H, 7.85.

Nuclear magnetic resonance (NMR) analysis proved the NMR spectra of tricyclo[3.3.2.0⁴,⁶]deca-2,7,9-triene to be temperature dependent. For example, the NMR spectra at 100° C. consisted only of a single sharp line at tau 5.8. At —40° C. however, the NMR spectra consisted of a multiplett centered around tau 4.4 and of a multiplett centered around tau 7.9 with relative peak area of 3:2.

EXAMPLE III

Pyrolysis of tricyclo[3.3.2.0⁴,⁶]deca-2,7,9-triene 1.0 gram of tricyclo [3.3.2.0⁴,⁶]deca-2,7,9-triene contained in an ampoule was heated for 10 minutes at a temperature of 350° C. The contents of the ampoule was then sublimated and the sublimate subjected to infrared analysis. The results of the infrared analysis as well as a melting point determination indicated that the composition was unchanged. Thereafter a second 1 gram sample of tricyclo[3.3.2.0⁴,⁶]deca-2,7,9-triene was heated as above for 10 minutes to a temperature of from about 400 to 450° C. After sublimation of the contents of the ampoule there were obtained white crystals having a melting point of 78 to 80° C. Infrared analysis indicated that the white crystals were naphthalene.

Although the invention has been illustrated by the preceding examples, the invention is not to be construed as limited to the materials or conditions employed herein, but rather the invention encompasses the generic area as hereinbefore disclosed. Various modifications and embodiments of this invention can be made without departing from the spirit and scope thereof.

What is claimed is:

1. A process for the preparation of tricyclo[3.3.2.0⁴,⁶] deca-2,7,9-triene which comprises heating cyclooctatetraene to a temperature sufficient to form the dimer of the formula:

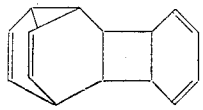

recovering and exposing said dimer to a radiation source having wavelengths shorter than 7000 angstroms and thereby cleaving the dimer across the cyclobutyl nucleus, and thereafter recovering said tricyclo[3.3.2.0⁴,⁶]deca-2,7,9-triene.

2. The process of claim 1 wherein said cyclooctatetraene is heated to a temperature of from about 25° C. to about 125° C.

3. The process of claim 1 wherein said cyclooctatetraene is heated in an inert atmosphere.

4. The process of claim 1 wherein said dimer is exposed to ultraviolet radiation.

5. The process of claim 1 wherein said dimer is exposed to ultraviolet radiation while said dimer is contained in an inert solvent.

6. A process for the preparation of tricyclo[3.3.2.0⁴,⁶] deca-2,7,9-triene from the cyclooctatetraene dimer of the formula:

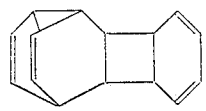

which comprises exposing said dimer to a radiation source having wavelengths shorter than 7000 angstroms and thereby cleaving the dimer across the cyclobutyl nucleus, and thereafter recovering said tricyclo[3.3.2.0⁴,⁶]deca-2,7,9-triene.

7. The process of claim 6 wherein said dimer is exposed to ultraviolet radiation.

8. The process of claim 6 wherein said dimer is exposed to ultraviolet radiation while said dimer is contained in an inert solvent.

9. The process of claim 6 wherein said dimer is exposed to radiation in wavelengths of from about 0.005 to about 4500 angstroms.

References Cited by the Examiner

W. O. Jones: Chem. and Ind., 1955, p. 16.
W. Von E. Doering et al.: Tetrahedron, 19, 715, May 1963.
Idem: Angew. Chem., 75, 27, 1963.
Idem: Angew. Chem., International edit. 2, 122, 1963.

References Cited by the Applicant

Preparation and Properties of Tricyclo[3.3.2.0⁴,⁶]Deca-2,7,9-Triene by Gerhard Schroder. Angewandte Chemie, International Edition in English, volume 2, 1963, No. 8, pages 481–482.

DELBERT E. GANTZ, *Primary Examiner.*

V. O'KEEFE, *Assistant Examiner.*